US012763031B1

(12) United States Patent
Zhou

(10) Patent No.: US 12,763,031 B1
(45) Date of Patent: Oct. 13, 2026

(54) DISPLAY PANEL AND DISPLAY DEVICE

(71) Applicant: Wuhan Tianma Microelectronics Co., Ltd., Wuhan (CN)

(72) Inventor: Shu Zhou, Wuhan (CN)

(73) Assignee: Wuhan Tianma Microelectronics Co., Ltd., Wuhan (CN)

( * ) Notice: Subject to any disclaimer, the term of this patent is extended or adjusted under 35 U.S.C. 154(b) by 0 days.

(21) Appl. No.: 19/315,706

(22) Filed: Sep. 1, 2025

(30) Foreign Application Priority Data

Jun. 24, 2025 (CN) ........................ 202510855617.X

(51) Int. Cl.
*G09G 3/32* (2016.01)
*G09G 3/3266* (2016.01)

(52) U.S. Cl.
CPC ..... *G09G 3/3266* (2013.01); *G09G 2300/043* (2013.01); *G09G 2300/0819* (2013.01); *G09G 2310/0286* (2013.01); *G09G 2310/08* (2013.01); *G09G 2330/021* (2013.01)

(58) Field of Classification Search
CPC ........ A61B 2034/107; A61B 2034/301; A61B 34/10; A61B 34/25; A61B 34/30; A61B 34/35; A61B 34/37; A61B 34/70; A61B 90/361; A61B 90/37; B25J 9/1671; G05B 2219/40418; G06T 1/0014; G06T 2207/10004; G06T 7/0012
USPC .......................................................... 345/204
See application file for complete search history.

(56) References Cited

U.S. PATENT DOCUMENTS

2022/0051630 A1* 2/2022 Shen .................... G09G 3/3291
2022/0223093 A1* 7/2022 Tian ..................... G09G 3/3208

FOREIGN PATENT DOCUMENTS

| | | | |
|---|---|---|---|
| CN | 117746768 | A | 3/2024 |
| CN | 118116306 | A | 5/2024 |
| CN | 118762629 | A | 10/2024 |
| CN | 119541410 | A | 2/2025 |
| CN | 119559878 | A | 3/2025 |
| KR | 20150055653 | A | 5/2015 |

OTHER PUBLICATIONS

The First Office Action for Chinese Application No. 202510855617.X, dated Jul. 18, 2026, 15 pages.

* cited by examiner

*Primary Examiner* — Insa Sadio
(74) *Attorney, Agent, or Firm* — East IP P.C.

(57) ABSTRACT

The present application discloses a display panel and a display device. The display panel includes multiple sub-pixels, pixel circuits respectively connected to the sub-pixels, a driver circuit including multiple cascaded shift registers each configured to output a primary scanning signal based on a clock signal, and multiple gating circuits corresponding to the shift registers. The shift registers are connected to the pixel circuits via the gating circuits, and the gating circuits each is configured to provide a scanning signal to at least one pixel circuit. The display panel has a display area including a first display sub-area and a second display sub-area. Data refresh is performed in each display sub-area in the first display mode. In the second display mode, data refresh is performed in the first display sub-area and data holding is performed in the second display sub-area.

20 Claims, 7 Drawing Sheets

DISPLAY PANEL AND DISPLAY DEVICE

CROSS-REFERENCE TO RELATED APPLICATIONS

This application claims priority to Chinese Patent Application No. 202510855617.X, filed on Jun. 24, 2025, which is hereby incorporated by reference in its entirety.

TECHNICAL FIELD

The present disclosure relates to the technical field of display devices, and in particular to a display panel and a display device.

BACKGROUND

With the development of science and technology, more and more electronic devices with display functions are being widely used in people's daily lives and work, bringing tremendous convenience to people's daily lives and work, and becoming an indispensable tool for people today. The main component that enables electronic devices to realize the display function is the display panel. In order to meet users' needs for display functions in multiple scenarios, it is necessary for the display panel to be able to realize zoned display.

SUMMARY

A first aspect of the present disclosure provides a display panel. The display panel includes a plurality of sub-pixels, a plurality of pixel circuits respectively connected to the plurality of sub-pixels, a driver circuit including a plurality of cascaded shift registers, and a plurality of gating circuits respectively corresponding to the plurality of shift registers. The plurality of shift registers each is configured to output a primary scanning signal based on a clock signal. The plurality of shift registers are connected to the plurality of pixel circuits via the plurality of gating circuits, and the plurality of gating circuits each are configured to provide a scanning signal to at least one of the plurality of pixel circuits. The display panel has a display area comprising a plurality of display sub-areas, the plurality of display sub-areas includes a first display sub-area and a second display sub-area, and a data refresh frequency of the first display sub-area is greater than a data refresh frequency of the second display sub-area. The display panel has a first display mode and a second display mode, data refresh is performed in each of the plurality of display sub-areas in the first display mode, and in the second display mode, data refresh is performed in the first display sub-area and data holding is performed in the second display sub-area. In each of the first display mode and the second display mode, shift registers of the plurality of shift registers corresponding to the first display sub-area and shift registers of the plurality of shift registers corresponding to the second display sub-area are each configured to receive the clock signal with a first clock frequency.

A second aspect of the present disclosure provides a display device including the above display panel.

With the above technical solution, in the display panel and the display device provided in the present disclosure, the shift registers in the driver circuit are connected to the pixel circuits via the gating circuits. In this way, the pixel circuits in the first display sub-area and the second display sub-area each can be configured to receive the scanning signal through their corresponding gating circuits, and the first display sub-area and the second display sub-area can each obtain scanning signals with different frequencies in the second display mode, so that the display panel can realize a zoned display function with different data refresh frequencies.

BRIEF DESCRIPTION OF THE DRAWINGS

To more clearly illustrate the technical solutions in the embodiments of present disclosure or related art, the following provides a brief introduction to the figures used in the description of the embodiments or the related art. It is evident that the figures described below are merely embodiments of present disclosure. For those skilled in the art, other figures can be obtained based on the provided figures without creative effort.

The structures, proportions, sizes, or the like depicted in the drawings of this specification are merely used to enable those skill in the art to understand and read it with reference to the contents disclosed in the specification, rather than limiting conditions for the implementation of present disclosure. Therefore, they do not have substantive technical significance. Any modifications to the structure, changes in proportional relationships, or adjustments to size, provided they do not affect the functionality or objectives achieved by the present disclosure, should still fall within the scope of the technical content disclosed in the present disclosure.

REFERENCE SIGNS

100—Sub-pixel; 101—First display sub-area; 102—Second display sub-area; 103—Pixel circuit; 104—Driver circuit; 1041—First driver circuit; 1042—Second driver circuit; 1043—Third driver circuit; 1044—Fourth driver circuit; 1045—Fifth driver circuit; 105—Shift register; 106—Gating circuit; 1061—First gating circuit; 1062—Second gating circuit; 1063—Third gating circuit; 107—Control chip; 108—Display device; AA—Display area; PVDD—First power supply signal; PVEE—Second power supply signal; T1—First control transistor; T2—Data writing transistor; T3—Driver transistor; T4—Threshold compensation transistor; T5—First reset transistor; T6—Second control transistor; T7—Second reset transistor; T8—Bias adjustment transistor; Cst—Storage capacitor; VREF1—First reset voltage; VREF2—Second reset voltage; VDATA—Data signal; DVH—Bias adjustment signal; N1—First node; N2—Second node; N3—Third node; N4—Fourth node; S1N—First scanning signal; S2N—Second scanning signal; SP—Third scanning signal; SP*—Fourth scanning signal; and EM—Light-emitting control signal.

DETAILED DESCRIPTION

With reference to the accompanying drawings in the embodiments of the present disclosure, the following description will provide a clear and complete explanation of the embodiments of the present disclosure. Those skilled in the art will understand that, with the development of technology and the emergence of new scenarios, the technical solutions provided in the embodiments of the present disclosure are also applicable to similar technical problems.

It is evident that the described embodiments are merely some of the embodiments of the present disclosure and not all of the embodiments. All other embodiments obtained by those skilled in the art without creative efforts based on the embodiments of the present disclosure fall within the protection scope of the present disclosure. The terms used in the embodiments of the present disclosure are only used to explain the specific embodiments of the present disclosure and are not intended to limit the present disclosure.

In order to make the above objectives, features, and advantages of the present disclosure more obvious and understandable, the present disclosure will be further described in detail below with reference to the accompanying drawings and specific embodiments.

Figure 1:
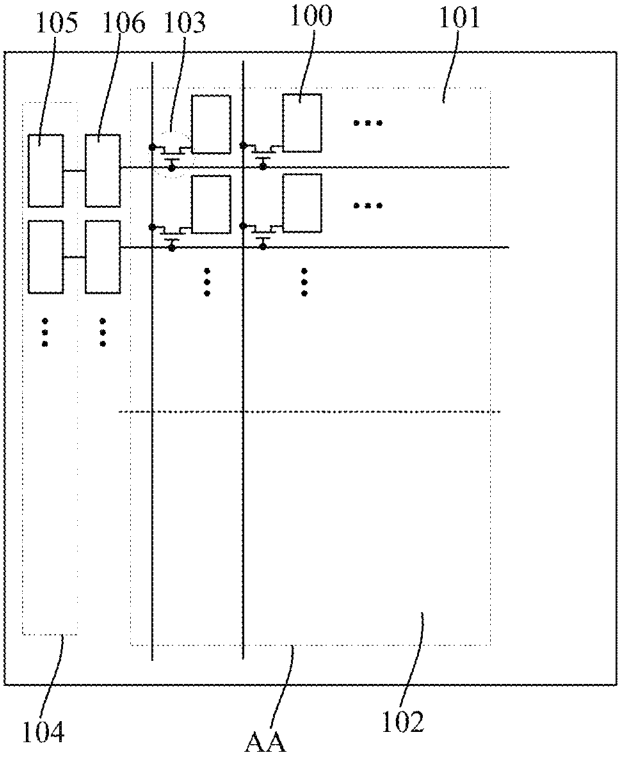
FIG. 1 is a schematic diagram of a display panel provided in some embodiments of the present disclosure.

Referring to FIG. 1, FIG. 1 is a schematic diagram of a display panel provided in some embodiments of the present disclosure. The display panel includes multiple sub-pixels 100, multiple pixel circuits 103 respectively connected to the multiple sub-pixels 100, a driver circuit 104 including multiple cascaded shift registers 105 each configured to output a primary scanning signal based on a clock signal, and multiple gating circuits 106. The gating circuits 106 correspond to the shift registers 105, respectively. The shift register 105 is connected to the pixel circuit 103 via the gating circuit 106, and the gating circuit 106 is configured to provide a scanning signal to the pixel circuit 103. The display panel has a display area AA including multiple display sub-areas. The display sub-areas include a first display sub-area 101 and a second display sub-area 102, and a data refresh frequency of the first display sub-area 101 is greater than a data refresh frequency of the second display sub-area 102. The display panel has a first display mode and a second display mode. In the first display mode, data refresh is performed in all display sub-areas. In the second display mode, data refresh is performed in the first display sub-area 101, and data holding is performed in the second display sub-area 102. In both the first display mode and the second display mode, the shift registers 105 corresponding to the first display sub-area 101 and the second display sub-area 102 are both configured to receive clock signals each with a first clock frequency, respectively.

In the display panel, the scanning signal with the required frequency can be provided through the gating circuits 106 corresponding to the pixel circuits 103 in the display sub-areas and the shift registers 105, thereby controlling the data refresh frequencies of the display sub-areas to form multiple display sub-areas in the display area AA. The pixel circuits 103 in each row in a same display sub-area are connected to scanning signals with a same frequency. If two sub-displays have different data refresh frequencies, the pixel circuits 103 in the two display sub-areas are provided with scanning signals with different frequencies.

In the embodiments of the present disclosure, the shift registers 105 in the driver circuit 104 are connected to the pixel circuits 103 via the gating circuits 106. In this way, the pixel circuits 103 in the first display sub-area 101 and the second display sub-area 102 can each provide scanning signals through their corresponding gating circuits 106. The first display sub-area 101 and the second display sub-area 102 can obtain scanning signals with different frequencies in the second display mode, so that the display panel can realize a zoned display function with different data refresh frequencies.

The pixel circuit 103 includes multiple interconnected transistors. FIG. 1 simply shows the pixel circuit 103 with only one transistor. The pixel circuit can adopt a circuit structure of seven transistors and one capacitor (7T1C), a circuit structure of eight transistors and one capacitor (8T1C), or other circuit structures. The present disclosure does not limit the structure of the pixel circuit 103.

Figure 2:
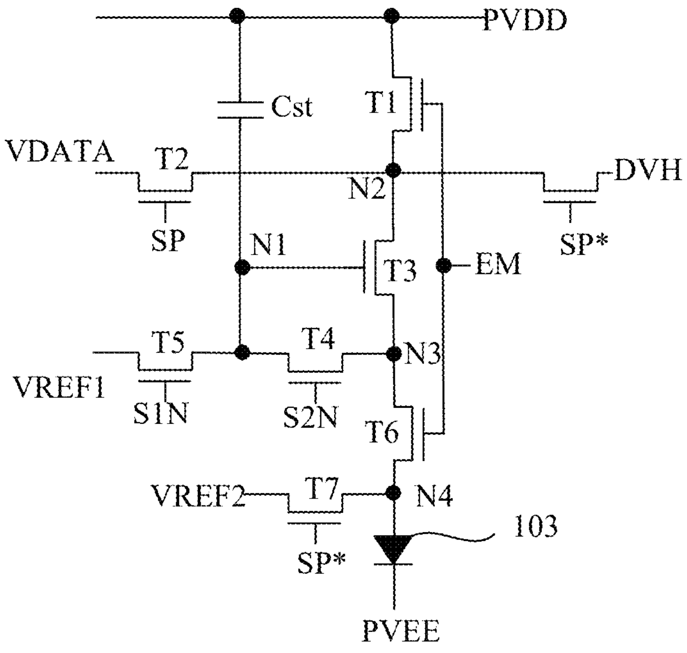
FIG. 2 is a schematic diagram of a pixel circuit provided in some embodiments of the present disclosure.
Figure 3:
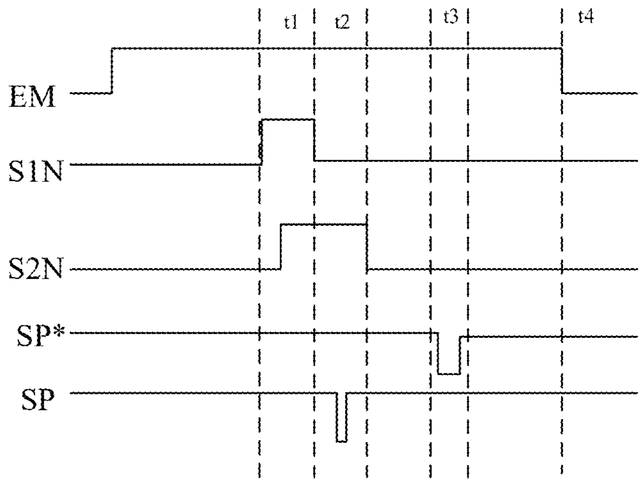
FIG. 3 is an operation timing sequence of the pixel circuit shown in FIG. 2.

Referring to FIGS. 2 and 3, FIG. 2 is a schematic diagram of a pixel circuit provided in some embodiments of the present disclosure, and FIG. 3 is an operation timing sequence of the pixel circuit shown in FIG. 2. The pixel circuit 103 includes a driver transistor T3 configured to transmit a driving current to the sub-pixel 100, a first reset transistor T5 including a first electrode electrically connected to a gate of the driver transistor T3 and a gate configured to receive a first scanning signal S1N, and a threshold compensation transistor T4 including a first electrode electrically connected to a first electrode of the driver transistor T3, a second electrode electrically connected to the gate of the driver transistor T3, and a gate configured to receive a second scanning signal S2N.

The gate of the driver transistor T3 is connected to a first node N1, the first electrode is connected to a third node N3, and the second electrode of the driver transistor T3 is connected to a second node n2. a second electrode of the first reset transistor t5 is configured to receive a first reset voltage VREF1. For a same transistor, one of its first electrode and second electrode serves as a source of the transistor, and the other serves as a drain of the transistor.

The pixel circuit 103 also includes a data writing transistor T2. A first electrode of the data writing transistor T2 is electrically connected to the second electrode of the driver transistor T3, a gate of the data writing transistor T2 is configured to receive a third scanning signal SP, and a second electrode of the data writing transistor T2 is connected to a data signal VDATA.

The pixel circuit 103 also includes a first control transistor T1 and a second control transistor T6. A first electrode of the first control transistor T1 is configured to receive a first power supply signal PVDD, a second electrode of the first control transistor T1 is connected to the second node N2, and a gate of the first control transistor T1 is configured to receive a light-emitting control signal EM. A first electrode of the second control transistor T6 is connected to the third node N3, a second electrode of the second control transistor T6 is connected to a fourth node N4, and a gate of the second control transistor T6 is configured to receive the light-emitting control signal EM. The sub-pixel 100 can be an organic light-emitting diode (OLED), an anode of the sub-pixel 100 is connected to the fourth node N4, and a cathode is configured to receive a second power supply signal PVEE. The first power supply signal PVDD can have a high level, and the second power supply signal PVEE can have a low level.

The pixel circuit 103 includes a second reset transistor T7. A first electrode of the second reset transistor T7 is configured to receive a second reset voltage VREF2, a second electrode of the second reset transistor T7 is connected to the fourth node N4, and a gate of the second reset transistor T7 is configured to receive a fourth scanning signal SP*.

The pixel circuit 103 includes a storage capacitor Cst. The storage capacitor Cst is connected between the first node N1 and the first electrode of the first control transistor T1.

The pixel circuit 103 includes a bias adjustment transistor T8. A first electrode of the bias adjustment transistor T8 is connected to the second node N2, a second electrode of the bias adjustment transistor T8 is configured to receive a bias adjustment signal DVH, and a gate of the bias adjustment transistor T8 is configured to receive the fourth scanning signal SP*.

In the pixel circuit 103 shown in FIG. 2, the first reset transistor T5 and the threshold compensation transistor T4 each can be an N-channel metal-oxide-semiconductor field-effect transistor (NMOSFET) fabricated using indium gallium zinc oxide (IGZO), while other transistors each can be a P-channel metal-oxide-semiconductor field-effect transistor (PMOSFET) fabricated using low temperature polysilicon (LTPS). The operation timing sequence of the pixel circuit 103 is shown in FIG. 3. One operation cycle of the pixel circuit 103 includes four stages, which are sequentially a reset stage t1, a threshold compensation and data writing stage t2, a bias adjustment stage t3, and a light-emitting stage t4.

During the reset stage t1, the first scanning signal S1N is at a high level, the first reset transistor T5 is turned on, and the first node N1 is voltage-reset based on the first reset voltage VREF1.

During the threshold compensation and data writing stage t2, a voltage at the first node N1 is the first reset voltage VREF1 so that the driver transistor T3 is turn on, a voltage of the driver transistor T3 is pulled up until the driver transistor T3 is turned off. When the driver transistor T3 is turned off, a gate voltage is VDATA+Vth, where Vth is a threshold voltage of the driver transistor T3. During this phase, the second scanning signal S2N is at a high level to control the threshold compensation transistor T4 to be turned on to perform threshold compensation on the driver transistor T3. When the third scanning signal SP is at a low level, it can control the data writing transistor T2 to be turned on, so that the data signal VDATA is written to the first node N1.

During the bias adjustment phase t3, the fourth scanning signal SP* is at a low level so that the bias adjustment transistor T8 is turned on, thereby adjusting a bias state of the driver transistor T3. During this phase, the second reset transistor T7 is also turned on, so that the fourth node N4 is reset using the second reset voltage VREF2.

During the light-emitting phase t4, the light-emitting control signal switches to a low level, so that the first control transistor T1 and the second control transistor T7 are turned on to form a driving current and transmit the driving current to the fourth node N4 to control the sub-pixel 100 to emit light.

FIGS. 2 and 3 illustrate an operation timing sequence of the pixel circuit 103 based on the 8T1C circuit structure. The operation timing sequences of the pixel circuits 103 with other structures can be set according to the pixel circuit structure, which will not repeated in the embodiments of the present disclosure. For example, the pixel circuit can adopt a 7T1C circuit structure that does not include the bias adjustment transistor T8, and the operation cycle of the pixel circuit 103 does not include the bias adjustment phase t3.

Optionally, the scanning signal provided by the driver circuit 104 to the pixel circuit 103 via the gating circuit 106 include at least one of the first scanning signal S1N to the fourth scanning signal SP*.

Different from the conventional display panel which directly provides various scanning signals to the pixel circuit 103 by the driver circuit 104, in the embodiment of the present disclosure, the driver circuit 104 is configured to provide the first scanning signal S1N to the third scanning signal SP to the pixel circuit 103 through the gating circuit 106. With the gating circuit 106, the frequency of each scanning signal can be adjusted, thereby dividing the display area AA into multiple display sub-areas and enabling each display sub-area to have its required data refresh frequency.

Figure 4:
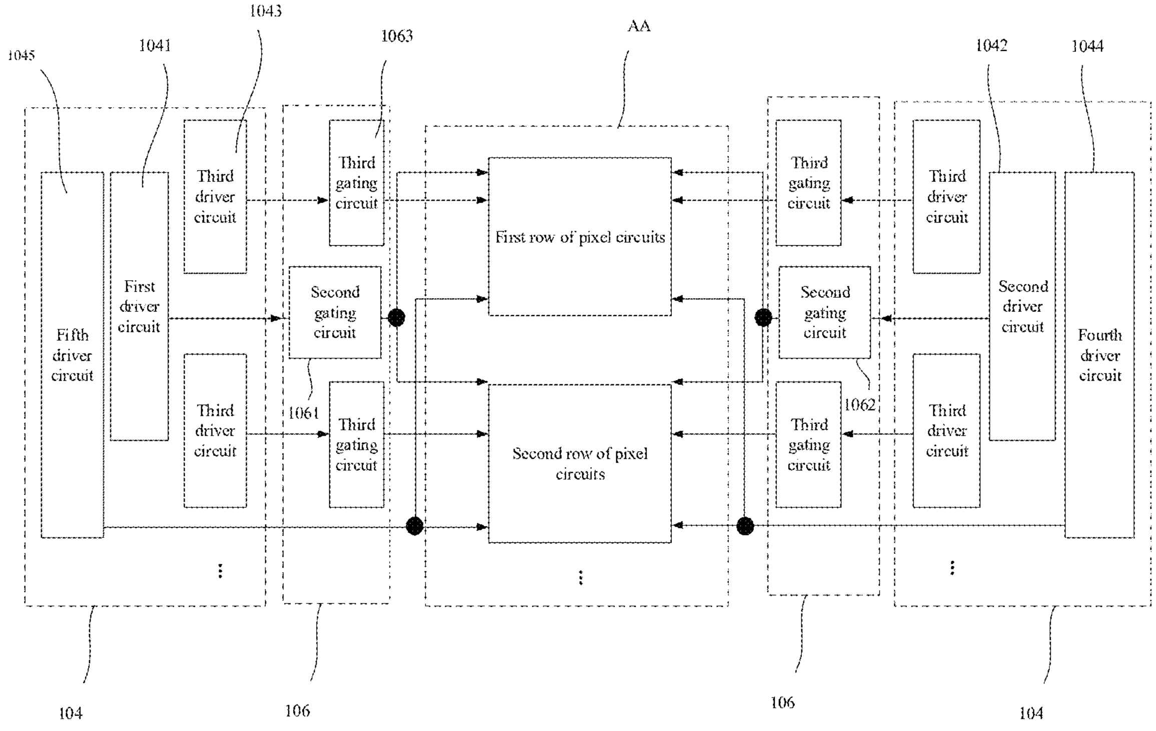
FIG. 4 is a schematic diagram of a layout principle of a driver circuit in a display panel provided in some embodiments of the present disclosure.

Referring to FIG. 4, FIG. 4 is a schematic diagram of a layout principle of a driver circuit in a display panel provided in some embodiments of the present disclosure. The driver circuits 104 include a first driver circuit 1041 and a second driver circuit 1042. The first driver circuit 1041 is configured to output a first primary scanning signal based on a first group of clock signals, and the second driver circuit 1042 is configured to output a second primary scanning signal based on a second group of clock signals. The first group of clock signals and the second group of clock signals can each include two clock signals with opposite phases. The two clock signals in the first group of clock signals can be a first clock signal SN_CK and a second clock signal SN_XCK.

The gating circuits 106 include a first gating circuit 1061 and a second gating circuit 1062. The first driver circuit 1041 is connected to a corresponding pixel circuit 103 via the first gating circuit 1061, and the second driver circuit 1042 is connected to a corresponding pixel circuit 103 via the second gating circuit 1062. The first gating circuit 1061 is configured to provide the first scanning signal S1N to the pixel circuit 103 based on a first control signal Ctrl1. The second gating circuit 1062 is configured to provide the second scanning signal S2N to the pixel circuit 103 based on a second control signal Ctrl2.

As shown in FIG. 4, the driver circuit 104 includes a third driver circuit 1043 configured to output a third primary scanning signal based on a third group of clock signals. The third group of clock signals can include two clock signals with opposite phases. The two clock signals in the third group of clock signals can be a third clock signal SP_CK and a fourth clock signal SP_XCK.

The gating circuits 106 further include a third gating circuit 1063. The third driver circuit 1043 is connected to a corresponding pixel circuit 103 via the third gating circuit 1063. The third gating circuit 1063 is configured to provide a third scanning signal SP to the pixel circuit 103 based on a third control signal Ctrl3.

To reduce a border width, the driver circuit 104 can be divided into two parts. Two areas at two opposite side of the display area AA in a row direction are a first border area (a non-display area on the left side of the display area AA in FIG. 4) and a second border area (a non-display area on the right side of the display area AA in FIG. 4), respectively. The two parts of the driver circuit 104 can be respectively set in the first border area and the second border area.

The display area AA is provided with multiple rows of pixel circuits 103. One of the first driver circuit 1041 and the second driver circuit 1042 is located in the first border area, and the other of the first driver circuit 1041 and the second driver circuit 1042 is located in the second border area. The shift register of each stage in the first driver circuit 1041 is connected to a corresponding row of pixel circuits 103 through a first gating circuit 1061.

The shift register of each stage in the first driver circuit 1041 is connected to two rows of pixel circuits 103 via a first gating circuit 1061, that is, the shift register of each stage in the first driver circuit 1041 drives two rows of pixel circuits 103. The shift register of each stage in the second driver circuit 1042 is connected to two rows of pixel circuits 103 via a second gating circuit 1062, that is, the shift register of each stage in the second driver circuit 1042 drives two rows of pixel circuits 103.

Multiple shift registers in the third driver circuit 1043 are divided into two groups. One group of shift registers in the third driver circuit 1043 are located in the first border area, and each are connected to one row of pixel circuits 103 via a third gating circuit 1063, i.e., each shift register drives one row of pixel circuits 103. The other group of shift registers in the third driver circuit 1043 are located in the second border area, and each are connected to one row of pixel circuits 103 via a third gating circuit 1063, i.e., each shift register drives one row of pixel circuits 103. In this configuration, two ends of each row of pixel circuits 103 can be connected to one shift register of the third driver circuit 1043 in the first border area via a third gating circuit 1063 and to one shift register of the third driver circuit 1043 in the second border area via a third gating circuit 1063, respectively, thereby enhancing the capability of the third driver circuit 1043 to drive the pixel circuit 103.

The driver circuits include a fifth driver circuit 1045 configured to provide the light-emitting control signal EM and a fourth driver circuit 1044 configured to provide the fourth scanning signal SP*. One of the fifth driver circuit 1045 and the fourth driver circuit 1044 can be located in the first border area, and the other of the fifth driver circuit 1045 and the fourth driver circuit 1044 can be located in the second border area to reduce the border width. In other embodiments, both the fifth driver circuit 1045 and the fourth driver circuit 1044 can be located in a same side border area. Both the fifth driver circuit 1045 and the fourth driver circuit 1044 each include multiple shift registers. Each shift register in the fifth driver circuit 1045 and the fourth driver circuit 1044 can be directly connected to the pixel circuit 103 without being connected to the gating circuit 106.

The shift register of each stage in the fourth driver circuit 1044 can be connected to two rows of pixel circuits 103, that is, the shift register of each stage in the fourth driver circuit 1044 drives two rows of pixel circuits 103. The shift register of each stage in the fifth driver circuit 1045 can be connected to two rows of pixel circuits 103, that is, the shift register of each stage in the fifth driver circuit 1045 drives two rows of pixel circuits 103.

Figure 5:
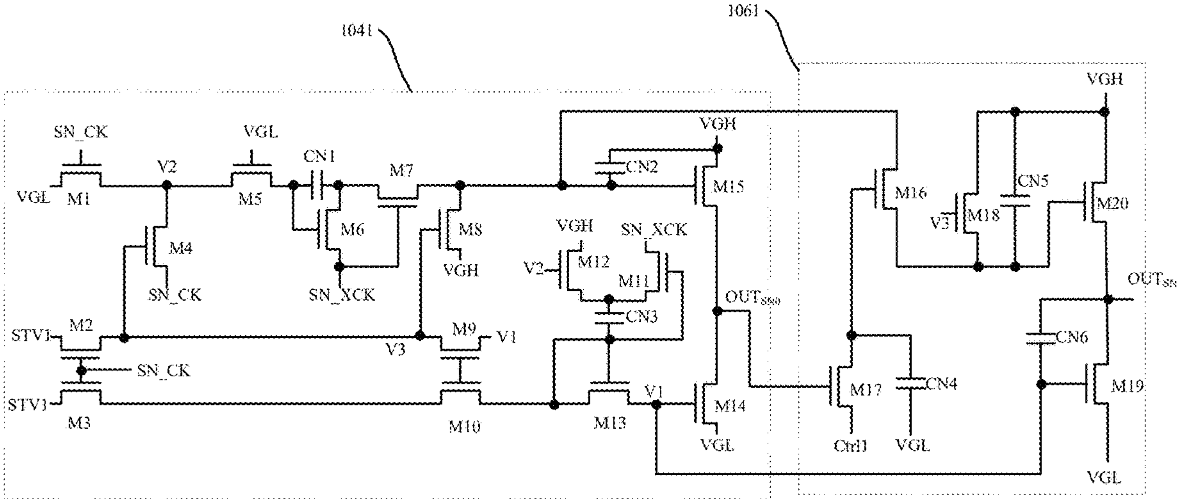
FIG. 5 is a circuit diagram illustrating a shift register in a first driver circuit and a first gating circuit connected thereto provided in some embodiments of the present disclosure.

Referring to FIG. 5, FIG. 5 is a circuit diagram illustrating a shift register in a first driver circuit and a first gating circuit connected thereto provided in some embodiments of the present disclosure.

As shown in FIG. 5, each shift register in the first driver circuit 1041 includes fifteen transistors and three capacitors. The fifteen transistors are M1 to M15, respectively, and the three capacitors are CN1 to CN3, respectively. An output terminal of the shift register in the first driver circuit 1041 is $OUT_{SN0}$ configured to output the first primary scanning signal. The shift register in the first driver circuit 1041 is configured to generate the first primary scanning signal based on a first input signal STV1, the first clock signal SN_CK, the second clock signal SN_XCK, a high level VGH, and a low level VGL.

As shown in FIG. 5, the shift register of each stage in the first driver circuit 1041 is connected to a first gating circuit 1061, and the first gating circuit 1061 includes five transistors and three capacitors. The five transistors are M16 to M20, respectively, and the three capacitors are CN4 to CN6, respectively. An output terminal of the first gating circuit 1061 is $OUT_{SN}$ configured to output the first scanning signal S1N. The first gating circuit 1061 is configured to generate the first scanning signal S1N based on the first primary scanning signal, the high level VGH, the low level VGL, and the first control signal Ctrl1.

The shift register of each stage in the first driver circuit 1041 can be connected to a same first control signal Ctrl1. The first control signal Ctrl1 is at a low level during data refresh and at a high level during data holding.

A circuit structure of each shift register in the second driver circuit 1042 is the same as the circuit structure of the shift register in the first driver circuit 1041. The second gating circuits 1062 connected to the shift registers in the second driver circuit 1042 are the same as the first gating circuits 1061 connected to the shift registers in the first driver circuit 1041. The circuit structure of the shift register in the second driver circuit 1042 and the second gating circuit 1062 connected to the shift register are not repeated in the present disclosure.

The shift register in the second driver circuit 1042 can generate the second primary scanning signal based on a second input signal STV2, a group of clock signals, the high level VGH, and the low level VGL. The second gating circuit 1062 is configured to generate the second scanning signal S2N based on the second primary scanning signal, the high level VGH, the low level VGL, and the second control signal Ctrl2.

The shift register of each stage in the second driver circuit 1042 can be connected to a same second control signal Ctrl2. The second control signal Ctrl2 is at a low level during data refresh and at a high level during data holding.

Figure 6:
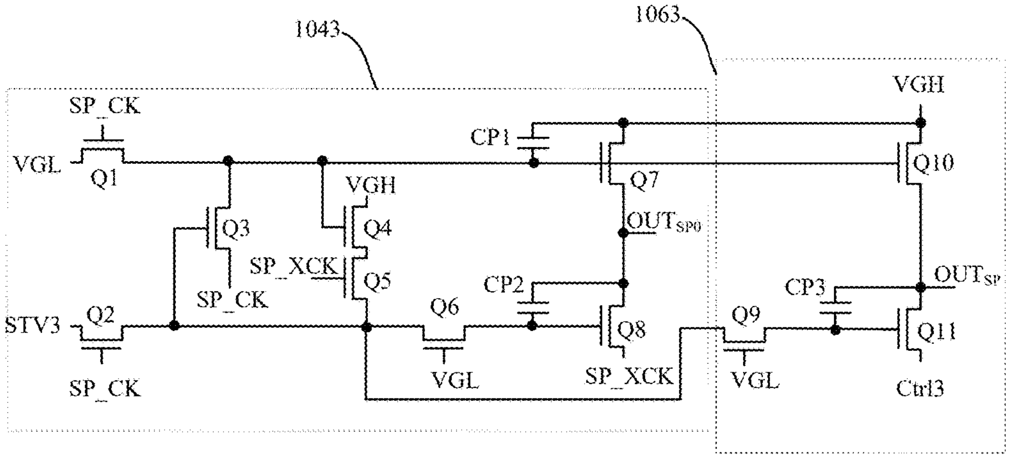
FIG. 6 is a circuit diagram illustrating a shift register in a third driver circuit and a third gating circuit connected thereto provided in some embodiments of the present disclosure.

Referring to FIG. 6, FIG. 6 is a circuit diagram illustrating a shift register in a third driver circuit and a third gating circuit connected thereto provided in some embodiments of the present disclosure.

As shown in FIG. 6, the shift registers in the third driver circuit 1043 each include eight transistors and two capacitors. The eight transistors are Q1 to Q8, respectively, and the two capacitors are CP1 to CP2, respectively. An output terminal of the shift register in the third driver circuit 1043 is $OUT_{SP0}$ configured to output the third primary scanning signal. The shift register in the third driver circuit 1043 is configured to generate the third primary scanning signal based on a third input signal STV3, the third clock signal SP_CK, the fourth clock signal SP_XCK, the high level VGH, and the low level VGL.

As shown in FIG. 6, the shift register of each stage in the third driver circuit 1043 is connected to a third gating circuit 1063. The third gating circuit 1063 includes three transistors and a capacitor. The three transistors are Q9 to Q11, respectively, and the capacitor is CP3. An output terminal of the third gating circuit 1063 is $OUT_{SP}$ configured to output the third scanning signal SP. The third gating circuit 1063 is configured to generate the third scanning signal SP based on the high level VGH, the low level VGL, and the third control signal Ctrl3.

For shift registers of adjacent stages in the third driver circuit 1043, the third control signal Ctrl3 provided to the third gating circuit 1063 connected to one stage of shift register is SP_CK_Ctrl, and the third control signal Ctrl3 provided to the third gating circuit 1063 connected to the other stage of shift register is SP_XCK_Ctrl. During data refresh, SP_CK_Ctrl and SP_XCK_Ctrl are two clock signals with opposite phases. During data holding, SP_CK_Ctrl and SP_XCK_Ctrl can be at a high level.

Figure 7:
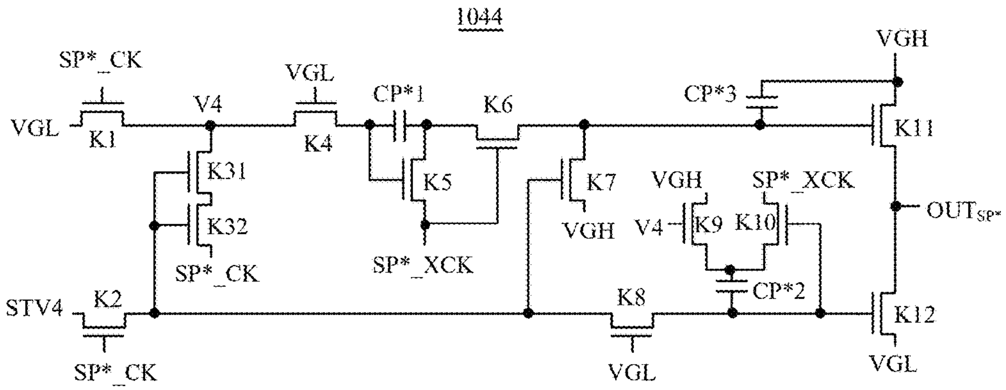
FIG. 7 is a circuit diagram of a shift register in a fourth driver circuit provided in some embodiments of the present disclosure.

Referring to FIG. 7, FIG. 7 is a circuit diagram of a shift register in a fourth driver circuit provided in some embodiments of the present disclosure. The shift register in the fourth driver circuit 1044 includes twelve transistors and three capacitors. The twelve transistors are K1 to K12, respectively, and the three capacitors are CP*1 to CP*3, respectively. K3 is a double-gate transistor including two sub-transistors K31 and K32. An output terminal of the shift register in the fourth driver circuit 1044 is $OUT_{SP*}$ configured to output the fourth scanning signal SP* The shift register in the fourth driver circuit 1044 is configured to generate the fourth scanning signal SP* based on a fourth input signal STV4, the high level VGH, the low level VGL, and a fourth group of clock signals (including SP*_CK and SP*_XCK).

The circuit structure of the shift register in the fifth driver circuit 1045 can be the same as the circuit structure of the shift register in the fourth driver circuit 1044, and is not repeated in the present disclosure. The shift register in the fifth driver circuit can generate the light-emitting control signal EM based on a fifth input signal STV5, the high level VGH, the low level VGL, and a group of clock signals.

When the display panel is displaying an image, there are multiple display sub-cycles contained within each unit time. For example, if N display sub-cycles are contained within each unit time, N is a positive integer greater than 1. N is related to the maximum data refresh frequency of the display panel. If the maximum data refresh frequency is 120 Hz, then N=120. For a specific display panel, its maximum data refresh frequency is fixed, so the number of display sub-cycles in a unit of time is also fixed, that is, for a specific display panel, N is a constant. The subsequent embodiments of present disclosure are described by taking the maximum data refresh frequency of the display panel being 120 Hz. The maximum data refresh frequency of the display panel can be set according to requirements and is not limited to 120 Hz; it can also be 144 Hz or other frequency values.

The first clock frequency is related to the maximum data refresh frequency of the display panel. In an embodiment, the first clock frequency can be a maximum clock frequency, and the display panel can achieve the maximum data refresh frequency based on the maximum clock frequency. Therefore, for a specific display panel, its maximum data refresh frequency and maximum clock frequency are fixed parameters, and the corresponding first clock frequency is a fixed parameter. In the first display mode and the second display mode, frequencies of the clock signals received by the shift registers in the driver circuit 104 each are the first clock frequency, so that a display driving with a normal timing sequence can be performed in the entire display area AA during a single display sub-cycle.

Figure 8:
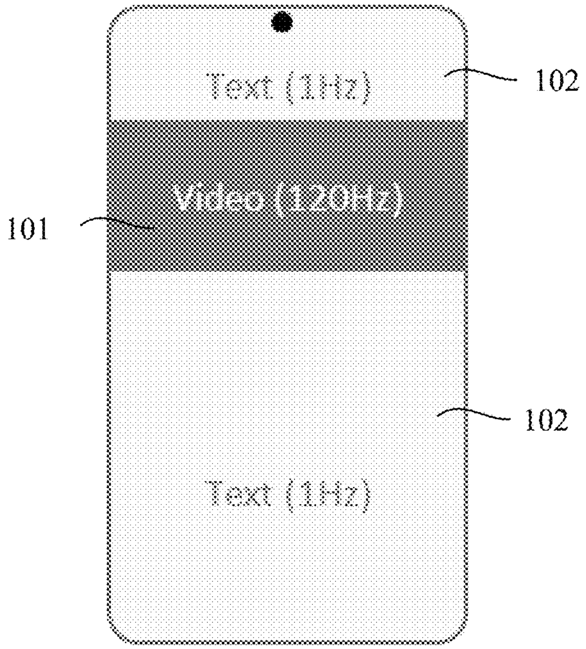
FIG. 8 is a principle schematic diagram of displaying by zone on a display panel provided in some embodiments of the present disclosure.
Figure 9:
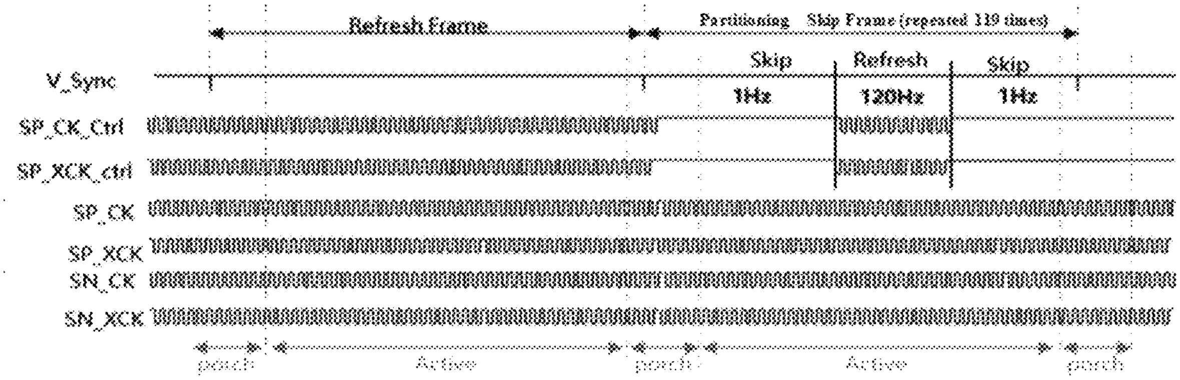
FIG. 9 is a timing sequence of the display panel shown in FIG. 8 when displaying by zone on the display panel.

Referring to FIGS. 8 and 9, FIG. 8 is a principle schematic diagram of displaying by zone on a display panel provided in some embodiments of the present disclosure, and FIG. 9 is a timing sequence of the display panel shown in FIG. 8 when displaying by zone on the display panel.

FIG. 8 illustrates an example where the display area AA of the display panel is divided into three display sub-areas along a column direction of the sub-pixels 100. In three display sub-areas, the middle display sub-area can be the first display sub-area 101, and the data refresh frequency of the first display sub-area 101 can be 120 Hz. The other two display sub-areas each can be the second display sub-area 102, and the data refresh frequency of the second display sub-area 102 is 1 Hz. The first display sub-area 101 can be configured to display video (Video), and the second display sub-area 102 can be configured to display text (Text).

If the display area AA in the display panel is divided into three display sub-areas as shown in FIG. 8, the display timing sequence for the three display sub-areas is as shown in FIG. 9. For one hundred and twenty consecutive display sub-cycles within a unit of time, since the data refresh frequency of the first display sub-area 101 is 120 Hz, data refresh is performed in the first display sub-area 101 in the one hundred and twenty display sub-cycles. Since the data refresh frequency of the second display sub-area 102 is 1 Hz, data refresh is performed in the second display sub-area 102 during only the 1st display sub-cycle, and data holding is performed during the remaining one hundred and nineteen display sub-cycles. Each display sub-cycle includes an active display phase (i.e., an active phase in FIG. 9) and a porch phase (i.e., a porch phase in FIG. 9). The porch phase is a gap between adjacent active display phases. For one hundred and twenty consecutive display sub-cycles within a unit of time, during the 1st display sub-cycle, data refresh is performed in all three display sub-areas, that is, the 1st frame is a refresh frame (Refresh Frame) for all display sub-areas.

The 2nd to the 120th display sub-cycles are all skip frames (Skip Frames) for the display sub-area. In the 2nd display sub-cycle to the 120th display sub-cycle, data refresh is performed in the first display sub-area 101, and data holding is performed in the second display sub-area 102. For illustrative purposes, FIG. 9 only shows the 1st display sub-cycle and the 2nd display sub-cycle, and the 2nd to 120th display sub-cycles are one hundred and nineteen display sub-cycles where a same display sub-cycle is repeated one hundred and nineteen times. In FIG. 9, V_Sync is a timing sequence reference signal. The timing sequence reference signal V_Sync has a low-level pulse in each porch phase, and a high-level is provided during a period between adjacent low-level pulses. A display integrated circuit (IC) can distinguish the time of a frame based on the timing sequence reference signal V_Sync.

As shown in FIG. 9, during the 1st display sub-cycle to the 120th display sub-cycle, for the first display sub-area 101, SP_CK_Ctrl and SP_XCK_Ctrl received by the third gating circuit 1063 connected to the pixel circuits 103 in the first display sub-area 101 are clock signals each normally performing timing sequence jumping, and data refresh can be performed in each display sub-cycle, thereby achieving a data refresh frequency of 120 Hz; for the second display sub-area 102, SP_CK_Ctrl and SP_XCK_Ctrl received by the third gating circuit 1063 connected to the pixel circuits 103 in the second display sub-area 102 are clock signals each normally performing timing sequence jumping during only the 1st display sub-cycle, and are fixed high levels during the 2nd display sub-cycle to the 120th display sub-cycle, so data refresh is performed in the second display sub-area 102 only during the 1st display sub-cycle, and data holding is performed during the subsequent one hundred and nineteen display sub-cycles, with only one refresh during a unit of time, thereby achieving the data refresh frequency of 1 Hz.

As shown in FIG. 9, during the 1st display sub-cycle, data refresh is performed in all display sub-areas, so the display panel is in the first display mode during the 1st display sub-cycle; during the 2nd display sub-cycle to the 120th display sub-cycle, data refresh is performed in all the first display sub-areas 101 each with a data refresh frequency of 120 Hz, data holding is performed in the second display sub-areas 102 each with a data refresh frequency of 1 Hz, so the display panel is in the second display mode from the 2nd display sub-cycle to the 120th display sub-cycle.

In both the first display mode and the second display mode, the frequencies of the clock signals received by the shift registers in the driver circuit 104 each are the first clock frequency, and as shown in FIG. 9, in both the first display mode and the second display mode, the third group of clock signals (SP_CK and SP_XCK) received by the shift register in the third driver circuit 1043 and the first group of clock signals (SN_CK and SN_XCK) received by the first driver circuit 1041 are configured to normally perform timing sequence jumping in a normal timing sequence, that is, both the first group of clock signals and the second group of clock signals have the first clock frequency.

When the display panel performs a zoned display, the data refresh frequencies in any two adjacent of the multiple display sub-areas are different. The display sub-area with a higher data refresh frequency in two adjacent display sub-areas is the first display sub-area 101, and the display sub-area with a lower data refresh frequency in two adjacent display sub-areas is the second display sub-area 102.

Figure 10:
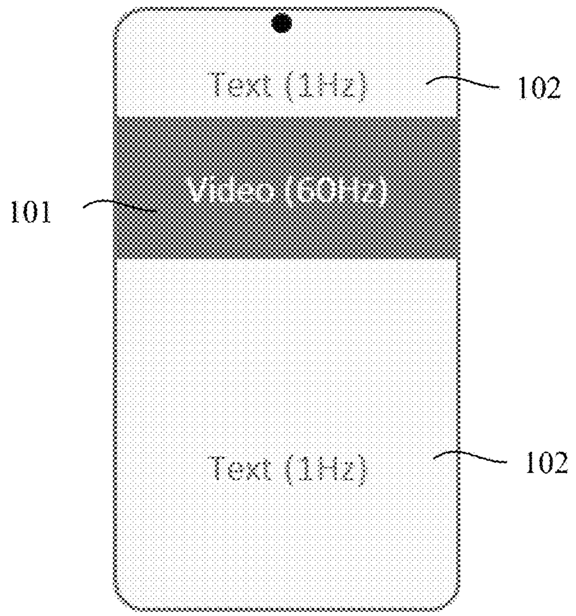
FIG. 10 is another principle schematic diagram of displaying by zone on a display panel provided in some embodiments of the present disclosure.
Figure 11:
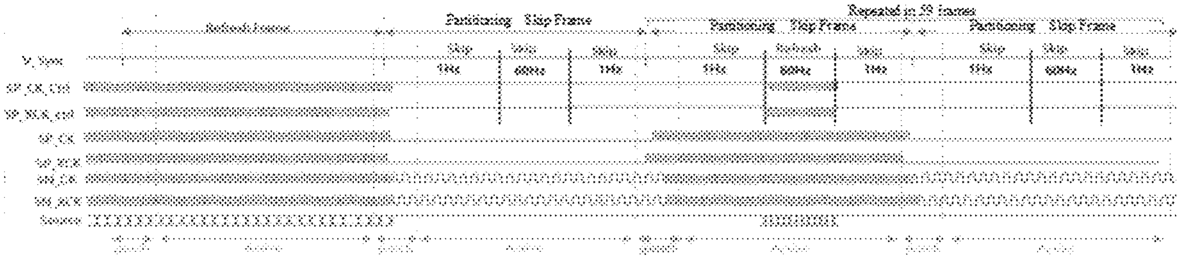
FIG. 11 is a timing sequence of the display panel shown in FIG. 10 when displaying by zone on a display panel.

Referring to FIGS. 10 and 11, FIG. 10 is another principle schematic diagram of displaying by zone on the display panel provided in some embodiments of the present disclosure, and FIG. 11 is a timing sequence of the display panel shown in FIG. 10 when displaying by zone on the display panel.

FIG. 10 also illustrates an example where the display area AA of the display panel is divided into three display sub-areas along the column direction of the sub-pixels 100. In the three display sub-areas, the middle display sub-area can be the first display sub-area 101, and the data refresh frequency of the first display sub-area 101 can be 60 Hz. The other two display sub-areas each can be the second display sub-area 102, and the data refresh frequency of the second display sub-area 102 is 1 Hz. The first display sub-area 101 can be configured to display video (Video), and the second display sub-area 102 can be configured to display text (Text).

If the display area AA in the display panel is divided into three display sub-areas as shown in FIG. 10, the display timing sequence for the three display sub-areas is as shown in FIG. 11. For one hundred and twenty consecutive display sub-cycles within a unit of time, since the data refresh frequency of the first display sub-area 101 is 60 Hz, data refresh and data holding are performed alternatively in the first display sub-area 101 in one hundred and twenty display sub-cycles. For example, data refresh can be performed during all odd display sub-areas, and data holding can be performed during all even display sub-areas. Since the data refresh frequency of the second display sub-area 102 is 1 Hz, data refresh is performed in the second display sub-area 102 during only the 1st display sub-cycle, and data holding is performed during the remaining one hundred and nineteen display sub-cycles.

During the 2nd display sub-cycle to the 120th display sub-cycle, data holding is performed in the first display sub-area 101 during all even display sub-cycles, and data refresh is performed during all odd display sub-cycles; and data holding is performed in the second display sub-area 102 in all display sub-cycles. For illustrative purposes, FIG. 11 only shows the 1st display sub-cycle to the 4th display sub-cycle, and every two of the 3rd display sub-cycle to the 120th display sub-cycle form a cycle unit, repeated a total of fifty nine times.

As shown in FIG. 11, for the first display sub-area 101, during each odd display sub-cycle, SP_CK_Ctrl and SP_XCK_Ctrl received by the third gating circuit 1063 connected to the pixel circuits 103 in the first display sub-area 101 are clock signals each normally performing timing sequence jumping, and during each even display sub-cycle, the SP_CK_Ctrl and SP_XCK_Ctrl received by the third gating circuit 1063 connected to the pixel circuits 103 are fixed high level, so that data refresh and data holding are performed alternately, thereby achieving the data refresh frequency of 60 Hz. For the second display sub-area 102, the SP_CK_Ctrl and SP_XCK_Ctrl received by the third gating circuit 1063 connected to the pixel circuits 103 in the second display sub-area 102 are clock signals each normally performing timing sequence jumping during only the 1st display sub-cycle, and are at fixed high levels during the 2nd display sub-cycle to the 120th display sub-cycle, so data refresh is performed in the second display sub-area 102 only during the 1st display sub-cycle, and data holding is performed during the subsequent one hundred and nineteen display sub-cycles, with only one refresh during a unit of time, thereby achieving the data refresh frequency of 1 Hz.

As shown in FIG. 11, during the 1st display sub-cycle, data refresh is performed in all display sub-areas, so the display panel is in the first display mode during the 1st display sub-cycle. During all odd display sub-cycles of the 3rd display sub-cycle to the 120th display sub-cycle, data refresh is performed in the first display sub-area 101, and data holding is performed in the second display sub-area 102, so the display panel is in the second display mode during these display sub-cycles.

In the embodiment of present disclosure, the display panel further includes a third display mode. In the third display mode, data holding is performed in all display sub-areas. In the third display mode, the clock frequency of the clock signal received by the shift register 105 corresponding to the second display sub-area 102 is not greater than the first clock frequency. As shown in FIG. 11, during each even display sub-cycle, data holding is performed in all display sub-areas, that is, the display panel is in the third display mode during all the even display sub-cycles.

In the embodiments of the present disclosure, based on any of the above embodiments, in the third display mode, the data signal is either at a high level or at a low level. In the third display mode, since data holding is performed in each display sub-area without data writing, a power consumption caused by data signal jumping can be reduced by setting the data signal to be at a fixed high level or a low level, thereby reducing the power consumption of the display panel. In FIG. 11, the data signal is denoted as "Source", and in the third display mode corresponding to each even display sub-cycle, the data signal is set to be at a high level.

When displaying by zone on a conventional display panel, a clock signal received by a shift register in a driver circuit 104 performs timing sequence jumping based on a first clock frequency. However, when performing low-frequency display in a display sub-area (a data refresh frequency being smaller than a maximum data refresh frequency), controlled by a corresponding gating circuit 106, low-frequency display driving can be performed in the display sub-area via a scanning signal, and a shift register in the corresponding driver circuit 104 can correspondingly decrease the frequency of a primary scanning signal, so that the power consumption of the display panel can be reduced by decreasing the clock frequency of the clock signal received by the shift register. In view of the above, in the embodiments of the present disclosure, when the display panel is in the third display mode, the second display sub-area 102 in which low-frequency display is performed has a clock frequency not greater than the first clock frequency, for example, the clock frequency of the clock signal received by the shift register 105 corresponding to the second display sub-area 102 can be set to be smaller than the first clock frequency, thereby reducing the power consumption of the display panel.

Optionally, in the third display mode, the clock frequencies of the clock signals received by the shift registers corresponding to each display sub-area each can be not greater than the first clock frequency, and the clock frequencies of the clock signals received by the shift registers corresponding to at least two display sub-areas are different, so that the clock frequencies of the clock signals received by the shift registers corresponding to different display sub-areas can be decreased through such differentiation, thereby both reducing the power consumption and optimizing display performance.

Optionally, in the third display mode, the clock frequencies of the clock signals received by the shift registers 105 corresponding to each display sub-area are not greater than the first clock frequency, e.g., the clock frequencies of the clock signals received by the shift registers 105 corresponding to each display sub-area being smaller than the first clock frequency, thereby significantly reducing the power consumption of the display panel. As shown in FIG. 11, during each even display sub-cycle, the display panel is in the third display mode, the clock frequencies of SN_CK and SN_XCK are smaller than the first clock frequency, and the clock frequencies of SP_CK and SP_XCK are smaller than the first clock frequency. In this way, the shift register in the first driver circuit 1041 and the shift register in the third driver circuit 1043 can reduce power consumption by decreasing the frequency of the received clock signals, thereby reducing the display power consumption of the display panel.

Optionally, in the third display mode, the shift registers 105 corresponding to at least two display sub-areas receive the clock signals each with a second clock frequency, and the second clock frequency is smaller than the first clock frequency. As shown in FIGS. 10 and 11, during each even display sub-cycle, the display panel is in the third display mode, and for two second display sub-areas 102 each with a data refresh frequency of 1 Hz, the clock frequencies of the corresponding SP_CK and SP_XCK each are the second clock frequency that is smaller than the first clock frequency. In this way, a timing sequence control to the shift registers in the third driver circuits 1043 corresponding to the two second display sub-areas 102 can be performed using SP_CK and SP_XCK each having a lower clock frequency, thereby reducing the power consumption of the shift registers in the third driver circuits 1043 corresponding to the two second display sub-areas 102 in the third display mode.

In one of the methods, the clock signal of the second clock frequency is at a fixed level, i.e., the clock signal is a direct current voltage during a period corresponding to the third display mode, and the clock signal does not jump between a high level and a low level. Optionally, the fixed level can be a high level of the clock signal, a low level of the clock signal, or has any other voltage value between the high level and the low level. As shown in FIG. 11, during each even display sub-cycle, for the two second display sub-areas 102 each with the data refresh frequency of 1 Hz, the clock frequencies of the corresponding SP_CK and SP_XCK are both the low level of the clock signal. In this method, the clock signal is at a fixed level in the third display mode without performing timing sequence jumping, which reduces the power consumption of the clock signal while simplifying the clock signal to the most extent, thereby facilitating the display control to the display panel in the third display mode.

Optionally, the driver circuit 104 is electrically connected to a first signal line configured to transmit a direct current voltage, and the direct current voltage is reused as a fixed level. In this method, in the third display mode, the existing direct current voltage in the driver circuit 104 can be reused as the fixed level, so as to utilize the following direct current voltage as the clock signal in the third display mode without additionally providing the fixed level, thereby reducing the number of the signal pins in the display IC.

Optionally, the clock signal with the second clock frequency is a square wave signal. As shown in FIGS. 10 and 11, for the two second display sub-areas 102 each with the data refresh frequency of 1 Hz, during each even display sub-cycle, SN_CK and SN_XCK are square wave signals, and a frequency of the square wave signal is smaller than the first clock frequency.

In the third display mode, the clock frequency of the clock signal received by the shift register corresponding to at least one display sub-area is set to be smaller than the first clock frequency, so that the power consumption caused by high-frequency timing sequence jumping of the clock signal in the shift register, thereby reducing the power consumption of the display panel.

In the second display mode, data refresh is performed in the first display sub-area 101, and data holding is performed in the second display sub-area 102. Although the second display sub-area 102 is in a low-frequency display state relative to the first display sub-area, the shift register corresponding to the second display sub-area 102 can reduce the power consumption by decreasing the clock frequency of the received clock signal. However, such configuration will cause the driver circuit 104 to be unable to perform display driving on the pixel circuits 103 in the first display sub-area 101 based on a normal timing sequence, resulting in display abnormalities. To avoid this problem, in the second display mode, the clock signals received by the shift registers corresponding to each display sub-area each have the first clock frequency, and as shown in FIG. 11, in the second display modes corresponding to the 3rd display sub-cycle and its subsequent display sub-cycles, SP_CK and SP_XCK, as well as SN_CK and SN_XCK, all perform timing sequence jumping based on the first clock frequency.

In an embodiment, in the third display mode, clock signals with the same clock frequency can be input into the shift registers in the driver circuit 104 to simplify the timing sequence control to each shift register. As shown in FIGS. 10 and 11, the display panel is in the third display mode during all even display sub-areas, the SP_CK and SP_XCK received by the shift registers in the third driver circuit 1043 corresponding to each display sub-area each are a clock signal with a constant low level, and SN_CK and SN_XCK received by the shift registers in the first driver circuit 1041 corresponding to each display sub-area each are a clock signal with a set low clock frequency (smaller than the first clock frequency).

In the embodiments of the present disclosure, when performing data holding on the entire screen, the frequencies of SP_CK and SP_XCK can be decreased, and the frequencies of SN_CK and SN_XCK can be decreased. When performing data holding on the entire screen, data holding is performed in all display sub-areas, and the display panel is in the third display mode. Optionally, in this method, a clock cycle of the clock signal corresponding to the shift register can be increased to a positive multiple of an initial clock cycle. The initial clock cycle is a clock cycle corresponding to the maximum clock frequency.

Optionally, clock cycles of SP_CK and SP_XCK can be increased to thirty two times the initial clock cycle or set to a low level, and clock cycles of SN_CK and SN_XCK can be increased to twice the initial clock cycle or set to a high level.

Optionally, the control signals and the data signals provided to the gating circuit 106 can not only have a decreased frequency in the third display mode but also have a decreased frequency in the second display mode. As shown in FIG. 11, during the 3rd display sub-cycle, data holding is performed in two first display sub-areas each with the data refresh frequency of 1 Hz, and their corresponding SP_CK_Ctrl, SP_XCK_Ctrl, and Source each can be set to a high level to reduce their timing sequence jumping, thereby reducing the power consumption.

The embodiments of the present disclosure can selectively decrease the frequency of the signal based on the display mode of the display panel, thereby maximizing the reduction of the power consumption in the display sub-areas with a local low refresh frequency in the display panel. Under the same frequency, when data refresh is performed on the entire screen of the display panel at a low data refresh frequency and data refresh is performed in a local area of the display panel at a low data refresh frequency, the power consumption in the same display sub-area is substantially equivalent.

Figure 12:
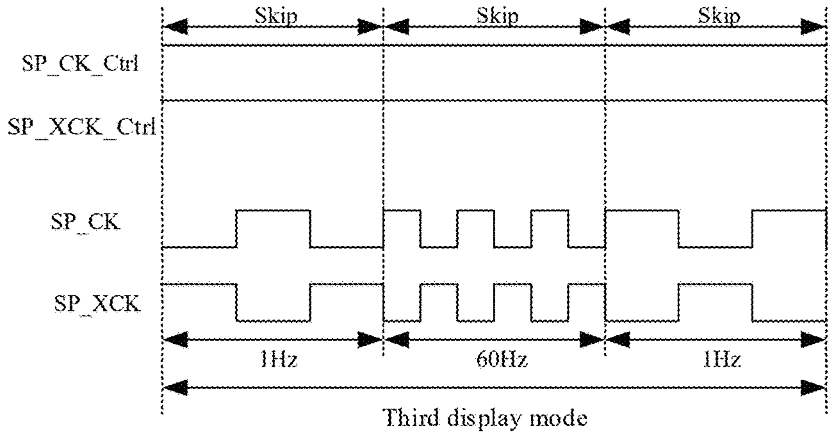
FIG. 12 is a timing sequence of a display panel in a third display mode provided in some embodiments of the present disclosure.

Referring to FIG. 12, FIG. 12 is a timing sequence of a display panel in a third display mode provided in some embodiments of the present disclosure. Display zones of the display panel in FIG. 12 are the same as those in FIG. 10 and can be divided into two second display sub-areas 102 each with the data refresh frequency of 1 Hz and one first display sub-area 101 with a data refresh frequency of 60 Hz. As mentioned above, in the third display mode, both SP_CK_Ctrl and SP_XCK_Ctrl are at a high level.

As shown in FIG. 12, in the third display mode, the shift register 105 corresponding to the first display sub-area 101 and the shift register 105 corresponding to the second display sub-area 102 are configured to receive clock signals with different frequencies. For example, for a same group of clock signals, such as SP_CK and SP_XCK, the SP_CK and SP_XCK received by the shift register corresponding to the first display sub-area 101 each can be set to have a different clock frequency from each of the SP_CK and SP_XCK received by the shift register corresponding to the second display sub-area 102. In this way, the clock frequencies of the clock signals received by the shift registers corresponding to the first display sub-area 101 and the second display sub-area 102 can be reduced through such differentiation, thereby both reducing the power consumption and optimizing display performance.

In the third display mode, the two methods shown in FIGS. 11 and 12 are compared. In the method shown in FIG. 11, during an even-numbered display sub-cycle, the display panel is in the third display mode, and for a same group of clock signals, clock frequencies of the clock signals received by the shift registers corresponding to the first display sub-area 101 and the second display sub-area are the same, e.g., SP_CK and SP_XCK being at low levels in the third display mode. In the method shown in FIG. 12, for a same group of clock signals, the clock frequencies of the clock signals received by the shift registers corresponding to the first display sub-area 101 and the second display sub-area are different, e.g., the clock frequencies of SP_CK and SP_XCK received by the shift register corresponding to the first display sub-area 101 being different from the clock frequencies of SP_CK and SP_XCK received by the shift register corresponding to the second display sub-area 102.

Optionally, in the third display mode, if the shift register 105 corresponding to the first display sub-area 101 and the shift register 105 corresponding to the second display sub-area 102 are configured to receive clock signals with different clock frequencies, the clock frequency of the clock signal received by the shift register 105 is positively correlated with the data refresh frequency of the corresponding display sub-area. For a same group of clock signals SP_CK and SP_XCK, since the data refresh frequency of 1 Hz is smaller than the data refresh frequency of 60 Hz, as shown in FIG. 12, the clock frequency of the clock signal of the shift register corresponding to the second display sub-area 102 is smaller than the clock frequency of the clock signal of the shift register corresponding to the first display sub-area 101. For a same group of clock signals, the clock frequency of the clock signal received by the shift register 105 corresponding to the first display sub-area 101 can be set to be greater than the clock frequency of the clock signal received by the shift register 105 corresponding to the second display sub-area 102, thereby improving the image display quality of the display panel in the third display mode.

As described above, there are multiple display sub-cycles within a unit of time. Taking the maximum data refresh frequency of the display panel being 120 Hz as an example, one hundred and twenty display sub-cycles can be provided in a unit of time. The unit time can be 1 s. At least two display sub-cycles are in the third display mode, as shown in FIG. 11, during each even display sub-cycle, data holding is performed in all display sub-areas, i.e., the display panel is in the third display mode during each even display sub-cycle.

In one of the methods, for a same display sub-area, in the third display modes corresponding to at least two display sub-cycles, the shift registers 105 corresponding to the display sub-area are configured to receive clock signals with a same clock frequency. As shown in FIG. 11, for a same group of clock signals, during each even display sub-cycle, the shift registers corresponding to a same display sub-area are configured to receive clock signals with a same clock frequency. In this method, in multiple third display modes, the shift registers corresponding to the same display sub-area are configured to receive clock signals with a same clock frequency, facilitating the timing sequence control to the shift registers in the display sub-area in each third display mode.

In FIG. 11, SN_CK and SN_XCK are clock signals in a same group. The display panel is in the third display mode during each even display sub-cycle, that is, each even-numbered display sub-cycle corresponds to one third display mode. In this method, in a same display sub-area, the SN_CK and SN_XCK received by the corresponding shift register are clock signals with a same clock frequency (smaller than the first clock frequency) in different third display modes.

In another method, for a same display sub-area, in third display modes corresponding to at least two display sub-cycles, the shift registers 105 corresponding to the display sub-area are configured to receive clock signals with different clock frequencies. In this method, for a same display sub-area, the corresponding shift registers are configured to receive clock signals with different clock frequencies in different third display modes, and the clock frequencies of the clock signals received by the shift registers corresponding to a same display sub-area are designed to be different in different third display modes, so that the display sub-area can achieve different degrees of frequency-decreasing for the clock signals in different third display modes, thereby reducing the power consumption while optimizing the image display quality of the display panel in the third display mode based on the different degrees of frequency-decreasing for the clock signals.

For a same display sub-area, in the third display modes corresponding to at least two display sub-cycles, if the shift registers 105 corresponding to the display sub-area are configured to receive clock signals with different clock frequencies, in multiple consecutive third display modes, for the same display sub-area, the clock frequency of the clock signal received by the corresponding shift register can be set to decrease gradually from the first clock frequency to a target frequency, and then increase gradually to the first clock frequency.

Taking the display zones shown in FIG. 10 as an example, if the display panel has the maximum data refresh frequency of 120 Hz, one hundred and twenty display sub-cycles are provided in a unit of time, all even display sub-cycles of the one hundred and twenty display sub-cycles are in the third display mode, and the display panel has sixty third display modes within a unit of time. In these sixty third display modes, the clock signal in the first thirty third display modes can have a frequency gradually decreasing from the first clock frequency to the target frequency, and the clock signal in the last thirty third display modes can have a frequency gradually increasing from the target frequency to the first clock frequency. In this way, the display panel takes one unit of time as a display cycle, the clock frequencies of the clock signals received by the shift register in two adjacent display cycles are both the maximum first clock frequency, and the clock signal has a gradually decreasing frequency during only the display cycle, which can reduce the power consumption while avoiding a significant change of the clock frequency between two adjacent display cycles, thereby preventing such significant change of the clock frequency from affecting display quality, and improving the image display quality of the display panel.

Optionally, for a same display sub-area, in all third display modes, the shift register 105 corresponding to the display sub-area is configured to alternately receive the clock signal with the third clock frequency and the clock signal with the fourth clock frequency, the third clock frequency is not equal to the fourth clock frequency, and at least one of the third clock frequency or the fourth clock frequency is smaller than the first clock frequency. In this method, taking the display zones shown in FIG. 10 as an example, if the maximum data refresh frequency of the display panel is 120 Hz, in sixty third display modes during a single display cycle, the shift register 105 in all third display modes is configured to alternately receive the clock signal with the third clock frequency and the clock signal with the fourth clock frequency, so that the image display quality of the display panel can be improved through the clock signals with periodic distributed clock frequencies.

It should be noted that when displaying by zone on the display panel, the display panel includes at least two display sub-areas with different data refresh frequencies. In multiple display sub-areas of the display panel, the data refresh frequencies of these display sub-areas can be different from each other; or at least two display sub-areas have different data refresh frequencies, at least two display sub-areas have a same data refresh frequency, and two adjacent display sub-areas have different data refresh frequencies. Taking the maximum data refresh frequency of 120 Hz as an example, Table 1 below provides display modes corresponding to the first to twelfth display sub-cycles for four different zoned display methods of the display panel.

TABLE 1

| | 1 | 2 | 3 | 4 | 5 | 6 | 7 | 8 | 9 | 10 | 11 | 12 |
|---|---|---|---|---|---|---|---|---|---|---|---|---|
| 60 HZ | REFRESH | SKIP1 | REFRESH | SKIP1 | REFRESH | SKIP1 | REFRESH | SKIP1 | REFRESH | SKIP1 | REFRESH | SKIP1 |
| 30 HZ | REFRESH | SKIP1 | SKIP2 | SKIP1 | REFRESH | SKIP1 | SKIP2 | SKIP1 | REFRESH | SKIP1 | SKIP2 | SKIP1 |
| 10 HZ | REFRESH | SKIP1 | SKIP2 | SKIP1 | SKIP2 | SKIP1 | SKIP2 | SKIP1 | SKIP2 | SKIP1 | SKIP2 | SKIP1 |
| | 1 | 2 | 3 | 4 | 5 | 6 | 7 | 8 | 9 | 10 | 11 | 12 |
| 30 HZ | REFRESH | SKIP1 | SKIP1 | SKIP1 | REFRESH | SKIP1 | SKIP2 | SKIP1 | REFRESH | SKIP1 | SKIP1 | SKIP1 |
| 20 HZ | REFRESH | SKIP1 | SKIP1 | SKIP1 | SKIP2 | SKIP1 | REFRESH | SKIP1 | SKIP2 | SKIP1 | SKIP1 | SKIP1 |
| 10 HZ | REFRESH | SKIP1 | SKIP1 | SKIP1 | SKIP2 | SKIP1 | SKIP2 | SKIP1 | SKIP2 | SKIP1 | SKIP1 | SKIP1 |
| | 1 | 2 | 3 | 4 | 5 | 6 | 7 | 8 | 9 | 10 | 11 | 12 |
| 60 HZ | REFRESH | SKIP1 | REFRESH | SKIP1 | REFRESH | SKIP1 | REFRESH | SKIP1 | REFRESH | SKIP1 | REFRESH | SKIP1 |
| 10 HZ | REFRESH | SKIP1 | SKIP2 | SKIP1 | SKIP2 | SKIP1 | SKIP2 | SKIP1 | SKIP2 | SKIP1 | SKIP2 | SKIP1 |
| | 1 | 2 | 3 | 4 | 5 | 6 | 7 | 8 | 9 | 10 | 11 | 12 |
| 30 HZ | REFRESH | SKIP1 | SKIP1 | SKIP1 | REFRESH | SKIP1 | SKIP1 | SKIP1 | REFRESH | SKIP1 | SKIP1 | SKIP1 |
| 10 HZ | REFRESH | SKIP1 | SKIP1 | SKIP1 | SKIP2 | SKIP1 | SKIP1 | SKIP1 | SKIP2 | SKIP1 | SKIP1 | SKIP1 |

As shown in Table 1, the four zoned display methods are the first zoning method to the fourth zoning method, respectively. In the first zoning method, the display panel includes at least three display sub-areas, with data refresh frequencies of 60 Hz, 30 Hz, and 10 Hz, respectively. In the second zoning method, the display panel includes at least three display sub-areas, with data refresh frequencies of 30 Hz, 20 Hz, and 10 Hz, respectively. In the third zoning method, the display panel includes at least two display sub-areas, with data refresh frequencies of 30 Hz and 10 Hz, respectively.

As shown in Table 1, a phase during which refresh data is performed in the display sub-area is denoted as REFRSH. In the first zoning method to the fourth zoning method, an initial data refresh is needed to be performed in all display sub-areas during the 1st display sub-cycle, so all display sub-areas in the first zoning method to the fourth zoning method are in the REFRSH state during the 1st display sub-cycle. A phase during which data holding is performed in the display sub-area is denoted as SKIP1 or SKIP2. During a same display sub-cycle, if all display sub-areas of the display panel are in the data holding phase, data holding status of each display sub-area is indicated as SKIP1; if data refresh is performed in some display sub-areas of the display panel and data holding is performed in another some display sub-areas, the status of the display sub-areas where data holding is performed is indicated as SKIP2.

For display sub-areas each with a data refresh frequency of 60 Hz, data refresh is performed every other display sub-cycle, so the display sub-cycle is in the REFRSH state during the odd display sub-cycle and is in the SKIP1 state during the even display sub-cycle. For example, in Table 1, the 1st display sub-cycle, the 3rd display sub-cycle, the 5th display sub-cycle, the 7th display sub-cycle, the 9th display sub-cycle, and the 11th display sub-cycle are in the REFRSH state, while the remaining display sub-cycles are in the SKIP1 state. For a display sub-area with a data refresh frequency of 30 Hz, data refresh is performed every three display sub-cycles, so the display sub-cycle is in the REFRSH state during the (4i-3)-th display sub-cycle, where i is a positive integer. For example, in Table 1, the 1st display sub-cycle, the 5th display sub-cycle, and the 9th display sub-cycle are in the REFRSH state, while the remaining display sub-cycles are in the SKIP1 state or SKIP2 state.

For a display sub-area with a data refresh frequency of 20 Hz, data refresh is performed every five display sub-cycles, so the display sub-cycle is in the REFRSH state during the (61-5)-th display sub-cycle, where i is a positive integer. For example, in Table 1, the 1st display sub-cycle and the 7th display sub-cycle are in the REFRSH state, while the remaining display sub-cycles are in the SKIP1 state or SKIP2 state.

For a display sub-area with a data refresh frequency of 10 Hz, data refresh is performed every eleven display sub-cycles, so the display sub-cycle is in the REFRSH state during the (12i-11)-th display sub-cycle, where i is a positive integer. For example, in Table 1, the 1st display sub-cycle is in the REFRSH state, while the remaining display sub-cycles are in the SKIP1 state or SKIP2 state.

As shown in Table 1, for a same zoned display method, during a same display sub-cycle, if all display sub-areas each are in the REFRSH state, the display panel is in the first display mode; if all display sub-areas each are in the SKIP1 state, the display panel is in the third display mode; if some display sub-areas each are in the REFRSH state and another some display sub-areas each are in the SKIP2 state, the display panel is in the second display mode.

As shown in Table 1, in the second zoning method and the fourth zoning method, there are three down consecutive third display modes during the 2nd display sub-cycle to the 4th display sub-cycle, and there are three down consecutive third display modes during the 10th display sub-cycle to the 12th display sub-cycle.

In one of the methods, for a same display sub-area, the display sub-area is in the third display mode during each of three adjacent display sub-cycles, and the shift register 105 corresponding to the display sub-area is configured to alternately receive the clock signal with a fifth clock frequency and the clock signal with a sixth clock frequency, where the fifth clock frequency is not equal to the sixth clock frequency, and at least one of the fifth clock frequency or the sixth clock frequency is smaller than the first clock frequency. In this method, during multiple consecutive third display modes, the shift register 105 corresponding to the same display sub-area is configured to alternately receive clock signals of two different clock frequencies, and at least one of the clock signals has a frequency lower than the first clock frequency. In this way, the power consumption can be reduced by decreasing the clock frequency in the third display mode, while also avoiding that the clock signal remains in a low clock frequency state for a long time, thereby improving the image display quality of the display panel in the third display mode.

In another method, for a same display sub-area, the display sub-area is in the third display mode during each of three adjacent display sub-cycles, and the clock signal received by the shift register 105 corresponding to the display sub-area has a frequency first decreasing and then increasing. This method can also reduce power consumption by decreasing the clock frequency in the third display mode, and can avoid that the clock signal remains in a low clock frequency state for a long time, thereby improving the image display quality of the display panel in the third display mode.

The maximum clock frequency of the clock signal is set as $f_{max}$. For a specific display panel, the maximum clock frequency $f_{max}$ of the clock signal is a fixed constant. In the third display mode, the clock frequency of the clock signal received by the shift register 105 corresponding to the display sub-area is $m/f_{max}$, where m is a positive integer greater than 1. The reciprocal of $f_{max}$ is a minimum clock cycle. This method can achieve integer-multiple decreasing frequency for the clock signal by increasing the clock signal cycle by integer multiples. This method can directly use the maximum clock frequency as a reference and achieve decreasing frequency for the clock signal in the third display mode through integer-multiple frequency decreasing, facilitating frequency decreasing control of the clock signal in the third display mode.

Figure 13:
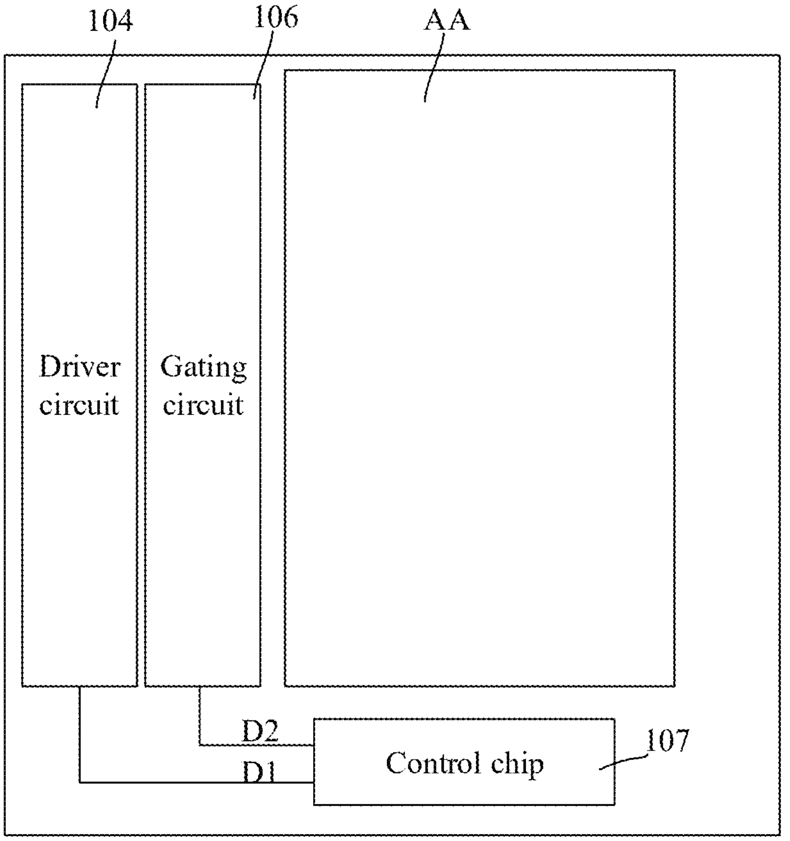
FIG. 13 is another schematic diagram of a display panel provided in some embodiments of the present disclosure.

Referring to FIG. 13, FIG. 13 is another schematic diagram of a display panel provided in some embodiments of the present disclosure. Based on the above embodiments, the display panel shown in FIG. 13 further includes a control chip 107 (which can be the above display IC), the control chip 107 includes a first pin and a second pin, the first pin is configured to transmit a clock signal with adjustable frequency, and the second pin is configured to transmit a control signal to the gating circuit 106.

When the display panel performs a zoned display, different display sub-areas of the display panel can have different data refresh frequencies based on the displayed dynamic and static images, thereby achieving power saving when displaying by zone on the display panel.

Since the display panel has multiple data refresh frequencies, the power consumption is reduced during different data write frames corresponding to display sub-areas with different data refresh frequencies to different extends. This is because, with multiple different data refresh frequencies, the scanning signals provided to the pixel circuits cannot be continuously at a high level or continuously at a low level with low data refresh frequencies, while the normal writing of the data signal VDATA must be maintained.

In the technical solution of the present disclosure, in the third display mode where data holding is performed in all display sub-areas, the clock frequency of the clock signal received by the shift register is decreased to achieve continuous decrease of the power consumption in the third display mode. In the first display mode and the second display mode, the shift register performs clock signal jumping based on a normal timing sequence to ensure the normal writing of the data signal VDATA, which achieves the goal of reducing power consumption while also ensuring normal display performance of the display panel when displaying by zone on the display panel.

Figure 14:
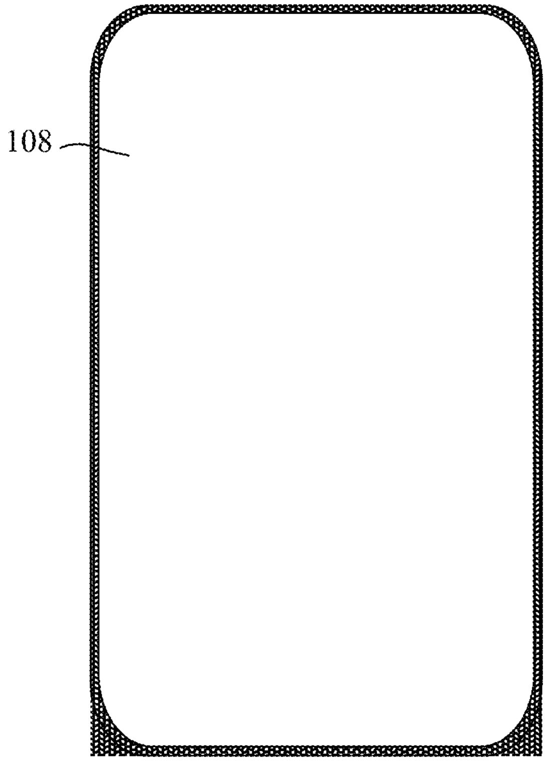
FIG. 14 is a schematic diagram of a display device provided in some embodiments of the present disclosure.

Based on the above embodiments, another embodiment of the present disclosure provides a display device 108, which is as shown in FIG. 14.

Referring to FIG. 14, FIG. 14 is a schematic diagram of a display device provided in some embodiments of the present disclosure. The display device 108 includes the display panel provided in any one of the above embodiments. The display device can be an electronic device with a display function, such as a mobile phone, a tablet computer, a laptop computer, or a wearable device. The present disclosure does not limit the type of electronic device.

The display device provided in the embodiments of the present disclosure includes the display panel provided in the above embodiments, which achieving zoned display while reducing power consumption.

The various embodiments described in the specification of present disclosure are described using a progressive, parallel, or a combination of the progressive and parallel methods. Each embodiment focuses on highlighting the differences from other embodiments, and identical or similar portions of the embodiments can be referred to each other accordingly.

The embodiments provided in present disclosure can be combined with one another without contradiction.

It should be noted that, in the description of present disclosure, it should be understood that the descriptions for the drawings and the embodiments are illustrative rather than limiting. The same reference signs in the drawings throughout the specification denote a same structure. Additionally, to facilitate understanding and description, the drawings can exaggerate the thickness of certain layers, films, panels, regions, etc. At the same time, it can be understood that when an element such as a layer, a film, an area, or a substrate is referred to as being disposed "on" another element, this element can be directly disposed on the other element, or an intermediate element can be provided. Additionally, disposing "on" refers to position one element on or below another element, but does not inherently mean positioning it on the upper side of another element according to the direction of gravity.

The terms indicating direction or positional relationships, such as "above," "below," "top," "bottom," "inner," and "outer," are presented based on the direction or positional relationships shown in the drawings and are merely for the purpose of facilitating the description of the present disclosure and simplifying the description, rather than indicating or implying that the apparatus or the element referred to must have a specific direction, be constructed in a specific direction, or operate in a specific direction. Therefore, they should not be construed as limiting the scope of the present disclosure. When a component is considered to be "connected" to another component, it can be directly connected to another component, or a component positioned centrally between them can be provided.

It should also be noted that in this specification, relationship terms such as "first" and "second" are used merely to distinguish one entity or operation from another entity or operation and do not necessarily require or imply any actual relationship or sequence between such entities or operations. Furthermore, the terms "include" and "have" or any of their variants are intended to encompass non-exclusive inclusion, such that an item or device including a series of elements not only includes those elements but also includes other elements not explicitly listed or elements inherent to such an item or device. Unless further restricted, elements defined by the phrase "including a . . . " do not preclude the presence of additional identical elements in the item or device including this element.

The above description of the disclosed embodiments enables those skilled in the art to realize or use the present disclosure. Various modifications to these embodiments will be apparent to those skilled in the art, and the general principles defined herein can be realized in other embodiments without departing from the spirit or scope of the present disclosure. Therefore, the present disclosure will not be limited to the embodiments illustrated herein, but claims the scope construed to encompass the broadest scope consistent with the principles and novel features disclosed herein.

What is claimed is:

1. A display panel, comprising:

a plurality of sub-pixels;

a plurality of pixel circuits respectively connected to the plurality of sub-pixels;

a driver circuit comprising a plurality of cascaded shift registers, the plurality of shift registers each being configured to output a primary scanning signal based on a clock signal; and a plurality of gating circuits respectively corresponding to the plurality of shift registers, the plurality of shift registers being connected to the plurality of pixel circuits via the plurality of gating circuits, and the plurality of gating circuits each being configured to provide a scanning signal to at least one of the plurality of pixel circuits;

a display area comprising a plurality of display sub-areas, the plurality of display sub-areas comprising a first display sub-area and a second display sub-area, and a data refresh frequency of the first display sub-area being greater than a data refresh frequency of the second display sub-area, wherein the display panel has a first display mode and a second display mode, in the first display mode, data refresh is performed in each of the plurality of display sub-areas, in the second display sub-area, data refresh is performed in the first display sub-area, and data holding is performed in the second display sub-area, and in each of the first display mode and the second display mode, shift registers of the plurality of shift registers corresponding to the first display sub-area and shift registers of the plurality of shift registers corresponding to the second display sub-area are each configured to receive a clock signal with a first clock frequency.

2. The display panel according to claim 1, wherein the display panel further has a third display mode in which data holding is performed in each of the plurality of display sub-areas; and in the third display mode, a clock signal received by the shift registers of the plurality of shift registers corresponding to the second display sub-area have a clock frequency not greater than the first clock frequency.

3. The display panel according to claim 1, wherein the display panel further has a third display mode in which data holding is performed in each of the plurality of display sub-areas; and in the third display mode, a clock signal received by shift registers of the plurality of shift registers corresponding to each of the plurality of display sub-areas have a clock frequency not greater than the first clock frequency.

4. The display panel according to claim 3, wherein in the third display mode, shift registers of the plurality of shift registers corresponding to at least two of the plurality of display sub-areas each are configured to receive a clock signal with a second clock frequency smaller than the first clock frequency.

5. The display panel according to claim 4, wherein the clock signal with the second clock frequency has a fixed level.

6. The display panel according to claim 5, wherein the driver circuit is electrically connected to a first signal line configured to transmit a direct current voltage, and the direct current voltage is reused as the fixed level.

7. The display panel according to claim 4, wherein the clock signal with the second clock frequency is a square wave signal.

8. The display panel according to claim 3, wherein in the third display mode, the clock signal received by the shift registers of the plurality of shift registers corresponding to the first display sub-area and the clock signal received by the shift registers of the plurality of shift registers corresponding to the second display sub-area have different clock frequencies.

9. The display panel according to claim 8, wherein in the third display mode, the clock frequency of the clock signal received by the shift registers is positively correlated with a data refresh frequency of a corresponding one of the plurality of display sub-areas.

10. The display panel according to claim 3, wherein a plurality of display sub-cycles are contained within a unit time, and the display panel is in the third display mode in at least two of the plurality of display sub-cycles; and for a same one of the plurality of display sub-areas, shift registers of the plurality of shift registers corresponding to the same one display sub-area are configured to receive the clock signal with a same clock frequency in the third display mode corresponding to the at least two of the plurality of display sub-cycles.

11. The display panel according to claim 3, wherein a plurality of display sub-cycles are contained within a unit time, and the display panel is in the third display mode in at least two of the plurality of display sub-cycles; and for a same one of the plurality of display sub-areas, shift registers of the plurality of shift registers corresponding to the same one display sub-area are configured to receive the clock signal with different clock frequencies in the third display modes corresponding to the at least two of the plurality of display sub-cycles.

12. The display panel according to claim 11, wherein for the same one of the plurality of display sub-areas, the shift registers of the plurality of shift registers corresponding to the same one display sub-area are configured to receive the clock signal with a third clock frequency and the clock signal with a fourth clock frequency alternatively during the at least two of the plurality of display sub-cycles corresponding to the third display mode, the third clock frequency being not equal to the fourth clock frequency, and at least one of the third clock frequency or the fourth clock frequency being smaller than the first clock frequency.

13. The display panel according to claim 11, wherein for the same one of the plurality of display sub-areas, the same one display sub-area is in the third display mode during each of at least three adjacent ones of the plurality of display sub-cycles, and the shift registers of the plurality of shift registers corresponding to the same one display sub-area are configured to receive the clock signal with a fifth clock frequency and the clock signal with a sixth clock frequency alternatively, the fifth clock frequency being not equal to the sixth clock frequency, and at least one of the fifth clock frequency or the sixth clock frequency being smaller than the first clock frequency.

14. The display panel according to claim 11, wherein for the same one of the plurality of display sub-areas, the same one display sub-area is in the third display mode during each of at least three adjacent ones of the plurality of display sub-cycles, and the shift registers of the plurality of shift registers corresponding to the same one display sub-area are configured to receive the clock signal with frequencies first decreasing and then increasing.

15. The display panel according to claim 3, wherein the clock signal has a maximum clock frequency $f_{max}$, and in the third display mode, the clock signal received by shift registers of the plurality of shift registers corresponding to one of the plurality of display sub-areas is $m/f_{max}$, m being a positive integer greater than 1.

16. The display panel according to claim 3, wherein at least one of the plurality of pixel circuits comprises:

a driver transistor configured to transmit a driving current to one of the plurality of sub-pixels, a first reset transistor comprising a first electrode electrically connected to a gate of the driver transistor, and a gate configured to receive a first scanning signal, and a threshold compensation transistor comprising a first electrode electrically connected to a first electrode of the driver transistor, a second electrode electrically connected to the gate of the driver transistor, and a gate configured to receive a second scanning signal;

the plurality of driver circuits comprise a first driver circuit and a second driver circuit, the first driver circuit being configured to output a first primary scanning signal based on a first group of clock signals, and the second driver circuit being configured to output a second primary scanning signal based on a second group of clock signals; and the plurality of gating circuits comprise a first gating circuit and a second gating circuit, the first driver circuit being connected to a corresponding one of the plurality of pixel circuits via the first gating circuit and configured to provide a first scanning signal to the corresponding pixel circuit based on a first control signal, and the second driver circuit being connected to a corresponding one of the plurality of pixel circuits via the second gating circuit and configured to provide a second scanning signal to the corresponding pixel circuit based on a second control signal.

17. The display panel according to claim 16, wherein the at least one of the plurality of pixel circuits further comprises a data writing transistor comprising a first electrode electrically connected to a second electrode of the driver transistor, a gate configured to receive a third scanning signal, and a second electrode configured to receive a data signal;

the plurality of driver circuits further comprise a third driver circuit configured to output a third primary scanning signal based on a third group of clock signals; and the plurality of gating circuits further comprise a third gating circuit, the third driver circuit is connected to a corresponding one of the plurality of pixel circuits via the third gating circuit, and the third gating circuit is configured to provide a third scanning signal to the corresponding pixel circuit based on a third control signal.

18. The display panel according to claim 17, wherein in the third display mode, the data signal is at a high level or a low level.

19. The display panel according to claim 1, further comprising:

a control chip comprising a first pin and a second pin, the first pin being configured to transmit a clock signal with adjustable frequency, and the second pin being configured to transmit control signals to the plurality of gating circuits.

20. A display device comprising a display panel comprising:

a plurality of sub-pixels;

a plurality of pixel circuits respectively connected to the plurality of sub-pixels;

a driver circuit comprising a plurality of cascaded shift registers, the plurality of shift registers each being configured to output a primary scanning signal based on a clock signal; and a plurality of gating circuits respectively corresponding to the plurality of shift registers, the plurality of shift registers being connected to the plurality of pixel circuits via the plurality of gating circuits, and the plurality of gating circuits each being configured to provide a scanning signal to at least one of the plurality of pixel circuits;

a display area comprising a plurality of display sub-areas, the plurality of display sub-areas comprising a first display sub-area and a second display sub-area, and a data refresh frequency of the first display sub-area being greater than a data refresh frequency of the second display sub-area, wherein the display panel has a first display mode and a second display mode, in the first display mode, data refresh is performed in each of the plurality of display sub-areas, in the second display sub-area, data refresh is performed in the first display sub-area, and data holding is performed in the second display sub-area, and in each of the first display mode and the second display mode, shift registers of the plurality of shift registers corresponding to the first display sub-area and shift registers of the plurality of shift registers corresponding to the second display sub-area are each configured to receive a clock signal with a first clock frequency.

* * * * *